(12) United States Patent
Brown et al.

(10) Patent No.: US 12,228,075 B2
(45) Date of Patent: Feb. 18, 2025

(54) INTEGRAL ENGINE INLET FRAME AIR-COOLED OIL COOLING APPARATUS

(71) Applicant: General Electric Company, Schenectady, NY (US)

(72) Inventors: Robert B. Brown, Medford, MA (US); Brian Devendorf, Georgetown, MA (US); Stephen G. Matava, Andover, MA (US); Emma Lebwohl, Somerville, MA (US); Michael T. Hogan, Tewksbury, MA (US); Susan Frances Redus, Malden, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/183,758

(22) Filed: Mar. 14, 2023

(65) Prior Publication Data
US 2024/0191659 A1 Jun. 13, 2024

Related U.S. Application Data

(60) Provisional application No. 63/431,551, filed on Dec. 9, 2022.

(51) Int. Cl.
| | |
|---|---|
| *F02C 7/14* | (2006.01) |
| *F02C 7/055* | (2006.01) |
| *F02C 7/18* | (2006.01) |
| *F02C 7/08* | (2006.01) |

(52) U.S. Cl.
CPC ............... *F02C 7/14* (2013.01); *F02C 7/055* (2013.01); *F02C 7/18* (2013.01); *F02C 7/08* (2013.01)

(58) Field of Classification Search
CPC .......... F05D 2260/213; F05D 2220/36; F05D 2220/323; F02C 7/14; F02C 7/224; F02C 7/04; F02C 7/047; F02C 7/18; F02C 7/08
See application file for complete search history.

(56) References Cited

U.S. PATENT DOCUMENTS

| | | | |
|---|---|---|---|
| 3,871,844 A * | 3/1975 | Calvin, Sr. | F02C 7/055 55/306 |
| 7,377,098 B2 * | 5/2008 | Walker | F01D 25/18 60/39.83 |
| 9,200,570 B2 | 12/2015 | Alecu | |

(Continued)

FOREIGN PATENT DOCUMENTS

| | | | |
|---|---|---|---|
| AU | 2022234026 A1 * | 8/2023 | A61M 60/148 |
| CN | 206694113 | 12/2017 | |

(Continued)

*Primary Examiner* — Craig Kim
(74) *Attorney, Agent, or Firm* — HANLEY, FLIGHT & ZIMMERMAN, LLC

(57) ABSTRACT

Example systems and methods for integrating an air-cooled oil cooler into an inlet frame of an engine are provided. An example gas turbine engine comprises an inlet frame including an inlet plenum at a first end of an inlet frame flow path, the inlet frame defining an airflow entrance to a compressor; the compressor to provide an airflow through the inlet frame; a pump to circulate a fluid; a plurality of struts supporting the inlet frame flow path; and a fluid core connected to the pump and built at least partially into the inlet frame of the gas turbine engine, the fluid core to route the fluid through the inlet plenum.

19 Claims, 14 Drawing Sheets

(56) References Cited

U.S. PATENT DOCUMENTS

| | | |
|---|---|---|
| 9,903,274 B2 | 2/2018 | Diaz et al. |
| 9,982,630 B2 | 5/2018 | Marini et al. |
| 10,107,200 B2 | 10/2018 | Miller et al. |
| 10,443,620 B2 * | 10/2019 | Hoefler .................. F04D 19/002 |
| 10,697,371 B2 | 6/2020 | Sennoun |
| 11,085,636 B2 * | 8/2021 | O'Connor ................ F23K 5/142 |
| 11,105,221 B2 * | 8/2021 | Schwarz .................... F02C 7/14 |
| 11,125,165 B2 * | 9/2021 | Niergarth .................. F02C 7/14 |
| 11,130,582 B2 * | 9/2021 | Smith ..................... F02C 7/047 |
| 11,248,526 B2 | 2/2022 | Tajiri et al. |
| 11,346,247 B2 * | 5/2022 | Zaccardi ................. F01D 25/12 |
| 11,391,211 B2 * | 7/2022 | Smith ..................... F02C 7/224 |
| 11,460,252 B2 * | 10/2022 | Colson .................... F28F 9/002 |
| 11,549,438 B2 * | 1/2023 | Bradbrook ............. F01D 9/041 |
| 11,649,730 B2 * | 5/2023 | Bradbrook ................ F02C 7/08 415/1 |
| 11,752,691 B2 * | 9/2023 | Colson .................... B33Y 80/00 264/497 |
| 2006/0042223 A1 * | 3/2006 | Walker .................... F01D 9/065 60/39.08 |
| 2017/0037776 A1 * | 2/2017 | Jones ....................... F01P 5/04 |
| 2019/0048798 A1 * | 2/2019 | Slawinska ............... F01D 25/02 |
| 2020/0378310 A1 * | 12/2020 | Tu .............................. F02C 7/36 |
| 2023/0203990 A1 * | 6/2023 | Adams .................... F02C 7/047 137/15.1 |

FOREIGN PATENT DOCUMENTS

| | | | | |
|---|---|---|---|---|
| CN | 208123416 | | 11/2018 | |
| CN | 115288909 A | * | 11/2022 | |
| EP | 1898069 | | 1/2015 | |
| EP | 3219959 A1 | * | 9/2017 | ............. F02C 7/185 |
| EP | 3778402 | | 6/2021 | |
| FR | 2951228 A1 | * | 4/2011 | ................ F02C 7/06 |
| WO | WO-2014118477 A1 | * | 8/2014 | ............. B60K 17/10 |

\* cited by examiner

INTEGRAL ENGINE INLET FRAME AIR-COOLED OIL COOLING APPARATUS

RELATED APPLICATION

This patent claims the benefit of U.S. Provisional Patent Application No. 63/431,551, which was filed on 9 Dec. 2022. U.S. Provisional Patent Application No. 63/431,551 is hereby incorporated herein by reference in its entirety. Priority to U.S. Provisional Patent Application No. 63/431,551 is hereby claimed.

FIELD OF THE DISCLOSURE

This disclosure relates generally to gas turbine engines and, more particularly, to oil cooling of gas turbine engines.

BACKGROUND

Turbine engines are some of the most widely used power generating technologies, often being utilized in aircraft and power-generation applications. A turbine engine generally includes a fan and a core arranged in serial flow communication with one another. The core of the turbine engine generally includes, a compressor section, a combustion section, a turbine section, and an exhaust section. Typically, a casing or housing surrounds the core of the turbine engine.

Lubricating and cooling fluids, such as oil, are used to lubricate and cool engine components through being circulated in lube and scavenge systems. By lubricating and cooling the engine components, the fluids are warmed and require heat dissipation to continue to be effective in lubricating and cooling engine components.

Figure 1A:
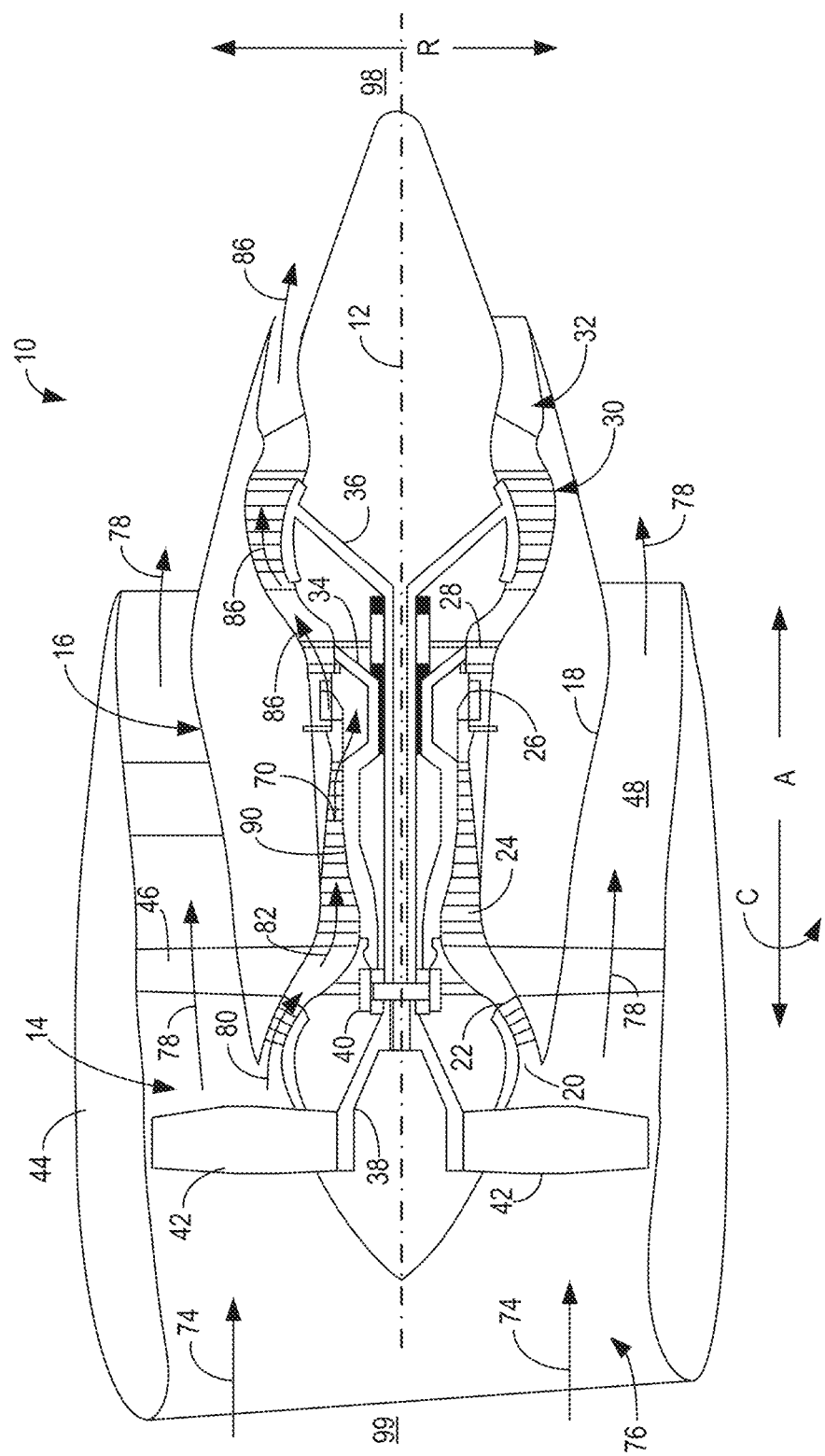
FIG. 1A illustrates an example cross-section view of an example turbofan gas turbine engine.

The figures are not to scale. Instead, the thickness of regions may be enlarged in the drawings. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" and/or "direct contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircrafts include engines that act as a propulsion system to generate mechanical power and forces such as thrust. A gas turbine, also called a combustion turbine or a turbine engine, is a type of internal combustion engine that can be implemented in the propulsion system of an aircraft. For example, a gas turbine can be implemented in connection with a turbofan, a turbojet, or a turboshaft aircraft engine. Gas turbines also have significant applications in areas such as industrial power generation.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the turbofan gas turbine engine 10.

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.).

As used herein, the terms "axial" and "longitudinal" both refer to a direction parallel to the centerline axis of a gas turbine (e.g., a turbofan, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to the radial direction from the outer circumference of the gas turbine towards the centerline axis of the gas turbine, and "radially outward" refers to the radial direction from the centerline axis of the gas turbine towards the outer circumference of gas turbine. As used herein, the terms "forward", "fore", and "front" refer to a location relatively upstream in an air flow passing through or around a component, and the terms "aft" and "rear" refer to a location relatively downstream in an air flow passing through or around a component.

The basic operation of a gas turbine implemented in connection with a turbofan engine of a propulsion system of an aircraft includes an intake of fresh atmospheric air flow through the front of the turbofan engine with a fan. In the operation of a turbofan engine, a first portion of the intake air bypasses a core gas turbine engine of the turbofan to produce thrust directly. A second portion of the intake air travels through a booster compressor (e.g., a first compressor) located between the fan and a high-pressure compressor (e.g., a second compressor) in the core gas turbine engine (e.g., the gas turbine). The booster compressor is used to raise or boost the pressure of the second portion of the intake air prior to the air flow entering the high-pressure compressor. The air flow can then travel through the high-pressure compressor that further pressurizes the air flow. The booster compressor and the high-pressure compressor each include a group of blades attached to a rotor and/or shaft. The blades spin at high speed relative to stationary vanes and each subsequently compresses the air flow. The high-pressure compressor then feeds the pressurized air flow to a combustion chamber (e.g., combustor). In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow. A secondary use of the compressors, particularly the high-pressure compressor, is to bleed air for use in other systems of the aircraft (e.g., cabin pressure, heating, and air conditioning, etc.)

In the combustion chamber of the core gas turbine engine, the fuel is ignited with an electric spark provided by an igniter, where the fuel in some examples burns at temperatures of more than 2000 degrees Fahrenheit. The resulting combustion produces a high-temperature, high-pressure gas stream (e.g., hot combustion gas) that passes through another group of blades called a turbine. The turbine can include a low-pressure turbine and a high-pressure turbine, for example. Each of the low-pressure turbine and the high-pressure turbine includes an intricate array of alternating rotating blades and stationary airfoil-section blades (e.g., vanes). The high-pressure turbine is located axially downstream from the combustor and axially upstream from the low-pressure turbine. As the hot combustion gas passes through the turbine, the hot combustion gas expands through the blades and/or vanes, causing the rotating blades coupled to rotors of the high-pressure turbine and the low-pressure turbine to spin.

The rotating blades of the high-pressure turbine and the low-pressure turbine serve at least two purposes. A first purpose of the rotating blades is to drive the fan, the high-pressure compressor, and/or the booster compressor to draw more pressured air into the combustion chamber. For example, in a dual-spool design of a turbofan, the low-pressure turbine (e.g., a first turbine) can be attached to and in force transmitting connection with the booster compressor (e.g., the first compressor) and fan via a first shaft, collectively a first spool of the gas turbine, such that the rotation of a rotor of the low-pressure turbine drives a rotor of the booster compressor and the fan. For example, a high-pressure turbine (e.g., a second turbine) can be attached to and in force transmitting connection with the high-pressure compressor (e.g., a second compressor) via a second shaft coaxial with the first shaft, collectively a second spool of the gas turbine, such that the rotation of a rotor of the high-pressure turbine drives a rotor of the high-pressure compressor. A second purpose of the rotating blades is to spin a generator operatively coupled to the turbine section to produce electricity. For example, the turbine can generate electricity to be used by an aircraft, a power station, etc.

It is generally an object of the design of aircraft engines, such as turbofans, to compress as much air as is feasible within the compressor of a core gas turbine engine given the static, dynamic, centrifugal and/or thermal stress limitations and weight considerations of aspects of the core gas turbine engine and/or the turbofan engine. A metric defining the compressive action of a compressor is a compression ratio (e.g., pressure ratio) of a compressor. The compression ratio of a compressor of a turbofan engine is the ratio of pressure at an outlet of the compressor (e.g., the outlet of the high-pressure compressor at the combustion chamber of the gas turbine) to pressure at an inlet of a fan. A higher compression ratio increases a thermal efficiency of the turbine engine and decreases a specific fuel consumption of the turbine engine (e.g., a ratio of fuel used to thrust produced by the jet engine). Thus, an increase in the compression ratio of the compressor of a gas turbine can increase thrust produced by a jet engine, such as a turbofan, etc., and/or can increase fuel efficiency of the jet engine. In turn, it is an object of gas turbine design to minimize or otherwise reduce pressure losses through the compressors to maximize or otherwise improve the compression ratio. Though examples disclosed herein are discussed in connection with a turbofan jet engine, it is understood that examples disclosed herein can be implemented in connection with a turbojet jet engine, a turboprop jet engine, a turboshaft jet engine, a combustion turbine for power production, or any other suitable application where it is desired to increase compression ratios across one or more compressors.

The example low-pressure compressor and high-pressure compressor of the turbine engine of the turbofan each include one or more stages. Each stage includes an annular array of compressor blades (e.g., first airfoils) mounted about a central rotor paired with an annular array of stationary compressor vanes (e.g., second airfoils) spaced apart from the rotor and fixed to a casing of the compressor. At an aft portion of a compressor stage, rotation of the rotor and accompanying blades provides an increase in velocity, temperature, and pressure of air flow. At a fore portion of the compressor stage, the air flow diffuses (e.g., loses velocity) across compressor vanes providing for an increase in pressure. The implementation of multiple stages across the low-pressure compressor and high-pressure compressor provides for the compression ratios to operate a jet engine such as a turbofan.

Engine systems contain oil and/or other fluids used to lubricate and cool gas turbine engine components by circulation through lubrication and scavenge systems, hereinafter referred to as "lube and scavenge systems". As noted herein, examples make use of oil as a lubricating fluid. However, in other examples, other fluids such as a synthetic fluid or air can be used as a substitute for oil. By lubricating and cooling the gas turbine engine components, the oil is warmed. Subsequently, the oil is to be cooled so that the oil can continue to be effective in continuing to cool the engine components. For example, the oil may break down at temperatures greater than 400 degrees Fahrenheit, which warrants heat exchanging methods. Heat exchanging methods, systems and apparatuses used to cool oil include air-cooled oil coolers and fuel-cooled oil coolers as heat exchangers. Heat exchangers pass oil from the lube and scavenge system around and/or through a core to make use of an ambient fluid, such as air, to cool the lubricating oil of the engine system. An example heat exchanger passes oil from a lube and scavenge system scavenge line, where the oil has been warmed, to a core where the oil is subject to cooling from air pulled in through dedicated ducting by an accessory gearbox driven fan. The air is subsequently warmed while the oil is cooled. Warmed air exits the engine compartment through dedicated ducting after the oil is cooled. The cooled oil then leaves the heat exchanger by continuing along a path supplied by the lube and scavenge system.

Example integral air-cooled oil coolers disclosed herein overcome the need for components such as driven fans and dedicated air ducting, which can otherwise be required to pull cool air in and push warmed air out. The integral air-cooled oil coolers disclosed herein are built as a whole or in part into or are otherwise connected to an inlet frame (hereinafter referred to as "integral") of a turbomachinery main core, which alleviates the need for a separate cooling circuit with additional components such as driven fans, etc., which add to the weight, size, and complexity of the cooling system. Instead, the integral air-cooled oil coolers disclosed herein make use of a downstream compressor that pulls air in to be compressed. By placing an air-cooled oil cooler in the air flow path (also referred to as an airflow entrance) of the downstream compressor, there is no need for a driven fan or separate external conduit. Instead, the lubricating oil of the system can be routed so that a main core airflow is pulled over a fluid core of the integral air-cooled oil cooler, resulting in warmed air and cooled oil. The result from rerouting the oil to an air-cooled oil cooler in the flow path of the downstream compressor is a reduction in extraneous components. Such a reduction results in improved efficiency, fewer components, a lighter weight, and reduced cost.

Additional example previous implementations of air-cooled oil coolers include the use of nacelle scoops to deliver cooling air to various systems and heat exchangers on a gas turbine engine. Nacelle scoops and surface coolers are integrated into the nacelle to create an air channel that allows airflow, or "scoops" ambient air. An example non-integral air-cooled oil cooler is placed partly in the air channel to circulate system oil which is cooled via the ambient air. In some examples, a non-integral air-cooled oil cooler also has a heat exchanger surface exposed to bypass air on the inner wall of a nacelle to facilitate cooling.

As disclosed herein, the example air-cooled oil cooler is integral to an inlet frame of an engine. Additional advantages to integrating an air-cooled oil cooler into the inlet frame of a turbomachinery main core and making use of the downstream compressor airflow is the elimination of nacelle inlet scoops. Integrating the air-cooled oil cooler into the inlet frame reduces drag, as associated with nacelle scoops. Additional benefits include not having to reroute oil paths to the nacelle and reducing potential leak paths.

Example air-cooled oil cooler components disclosed herein may be wetted to increase heat dissipation. For example, a plurality of struts, an exterior surface of a fluid core, heat rejection fins, or other outer surface designed to increase surface area of an air-cooled oil cooler may be wetted with a cooling fluid such as oil to increase heat dissipation. By increasing the amount of heat rejection, the lube and scavenge system is able to stay cooler and more effective longer than if there were no heat rejection techniques used.

Additionally, the air-cooled oil coolers disclosed herein can be composed of materials formed from casting, machining, or additive manufacturing. In an example air-cooled oil cooler, aluminum is used.

Figure 1B:
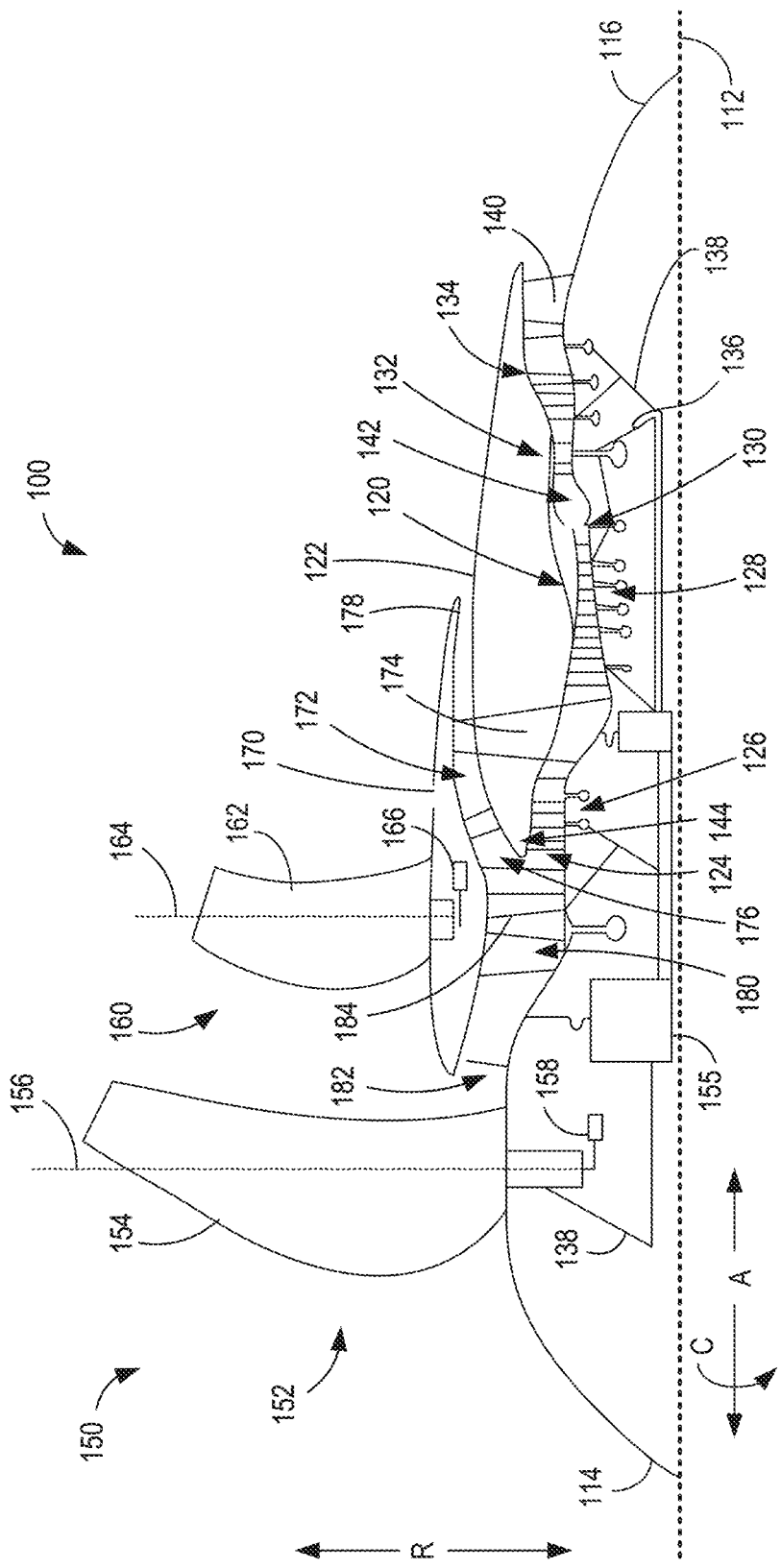
FIG. 1B illustrates an example cross-section view of an example open rotor engine.
Figure 1C:
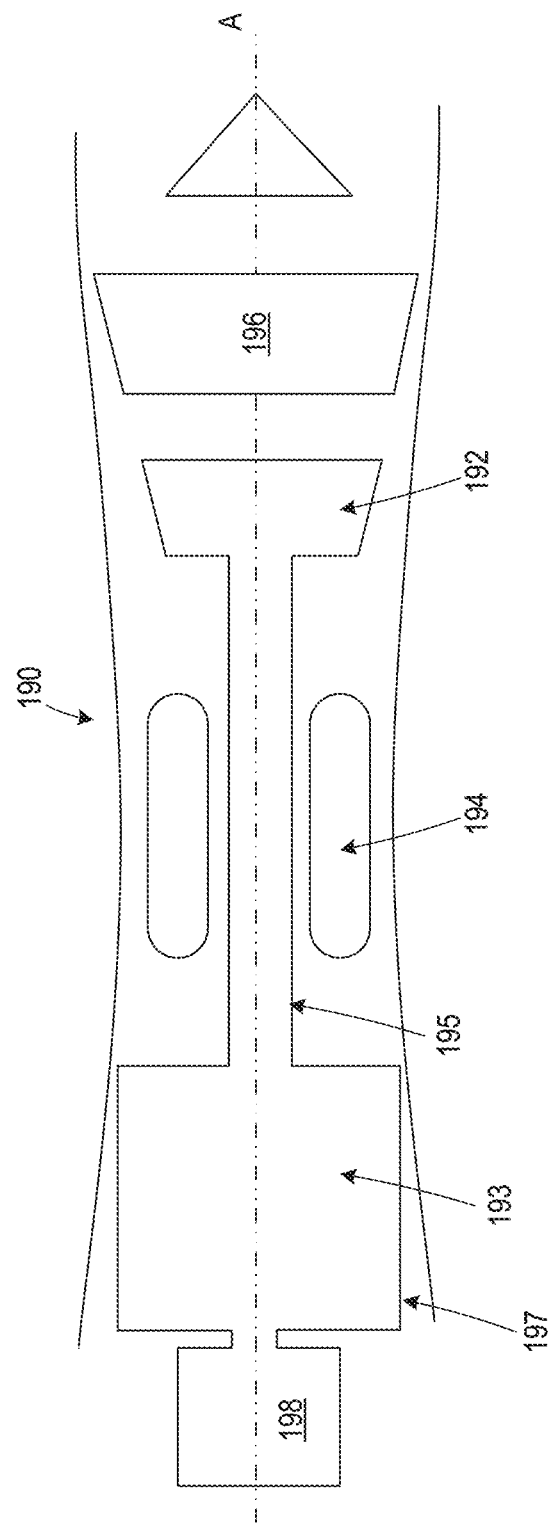
FIG. 1C illustrates an example cross-section view of an example turboshaft engine.

Example integral air-cooled oil coolers can be applied to both closed and open rotor engine designs. For purposes of illustration only, FIG. 1A illustrates an example closed-rotor turbofan engine, and FIG. 1B illustrates an example open-rotor engine. FIG. 1C further illustrates a turboshaft engine. An integral air-cooled oil cooler can be applied to a variety of engine designs including but not limited to turboshafts, turbofans, turbojets, turboprops, ducted engines, unducted engines, and the like.

FIG. 1A is a schematic partially cross-sectioned side view of a turbofan gas turbine engine 10. In this example, the turbofan gas turbine engine 10 may particularly be configured as a gas turbine engine for an aircraft. Although further described herein as a turbofan engine, the turbofan gas turbine engine 10 may define a turboshaft, turboprop, or turbojet gas turbine engine, including marine and industrial engines and auxiliary power units. As shown in FIG. 1A, the turbofan gas turbine engine 10 has a longitudinal or axial centerline axis 12 that extends therethrough for reference purposes. An axial direction A is extended co-directional to the axial centerline axis 12 for reference. The turbofan gas turbine engine 10 further defines an upstream end 99 and a downstream end 98 for reference. In general, the turbofan gas turbine engine 10 may include a fan assembly 14 and a core engine 16 disposed downstream from the fan assembly 14. For reference, the turbofan gas turbine engine 10 defines an axial direction A, a radial direction R, and a circumferential direction C. In general, the axial direction A extends parallel to the axial centerline axis 12, the radial direction R extends outward from and inward to the axial centerline axis 12 in a direction orthogonal to the axial direction A, and the circumferential direction extends three hundred sixty degrees (360°) around the axial centerline axis 12.

The core engine 16 may generally include a substantially tubular outer casing 18 that defines an annular core inlet 20. The tubular outer casing 18 encases or at least partially forms, in serial flow relationship, a compressor section having a booster or low pressure compressor 22, a high pressure compressor 24, a heat addition system 26, an expansion section or turbine section including a high pressure turbine 28, a low pressure turbine 30 and a jet exhaust nozzle section 32. A high pressure shaft 34 drivingly connects the high pressure turbine 28 to the high pressure compressor 24. A low pressure shaft 36 drivingly connects the low pressure turbine 30 to the low pressure compressor 22. The low pressure shaft 36 may also be connected to a fan shaft 38 of the fan assembly 14. In certain examples, as shown in FIG. 1A, the low pressure shaft 36 may be connected to the fan shaft 38 via a reduction gear 40 such as in an indirect-drive or geared-drive configuration.

As shown in FIG. 1A, the fan assembly 14 includes a plurality of fan blades 42 that are coupled to and that extend radially outwardly from the fan shaft 38. An annular fan casing or nacelle 44 circumferentially may surround the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a fan flow passage 48 therebetween. However, it should be appreciated that various configurations of the turbofan gas turbine engine 10 may omit the nacelle 44, or omit the nacelle 44 from extending around the fan blades 42, such as to provide an open rotor or propfan configuration of the turbofan gas turbine engine 10 depicted in FIG. 1B.

It should be appreciated that combinations of the high pressure shaft 34, the low pressure shaft 36, the low pressure compressor 22, the high pressure compressor 24, the high pressure turbine 28, and the low pressure turbine 30 define a rotor assembly 90 of the turbofan gas turbine engine 10. For example, the high pressure shaft 34, high pressure compressor 24, and high pressure turbine 28 may define a high speed or high pressure rotor assembly of the turbofan gas turbine engine 10. Similarly, combinations of the low pressure shaft 36, low pressure compressor 22, and low pressure turbine 30 may define a low speed or low pressure rotor assembly of the turbofan gas turbine engine 10. Various examples of the turbofan gas turbine engine 10 may further include the fan shaft 38 and fan blades 42 as the low pressure rotor assembly. In certain examples, the turbofan gas turbine engine 10 may further define a fan rotor assembly at least partially mechanically de-coupled from the low pressure spool via the fan shaft 38 and the reduction gear 40. Still further examples may further define one or more intermediate rotor assemblies defined by an intermediate pressure compressor, an intermediate pressure shaft, and an intermediate pressure turbine disposed between the low pressure rotor assembly and the high pressure rotor assembly (relative to serial aerodynamic flow arrangement).

During operation of the turbofan gas turbine engine 10, a flow of air 74 enters an inlet 76 of the turbofan gas turbine engine 10 defined by the fan case or nacelle 44. A portion of air 80 enters the core engine 16 through an annular core inlet 20 defined at least partially via the tubular outer casing 18. The flow of air 80 is provided in serial flow through the compressors 22, 24, the heat addition system 26, and the expansion section via a core flowpath 70. The flow of air 80 is increasingly compressed as it flows across successive stages of the low pressure compressor 22 and high pressure compressor 24. The compressed air 82 enters the heat addition system 26 and mixes with a liquid and/or gaseous fuel and is ignited to produce combustion gases 86. It should be appreciated that the heat addition system 26 may form any appropriate system for generating combustion gases, including, but not limited to, deflagrative or detonative combustion systems, or combinations thereof. The heat addition system 26 may include annular, can, can-annular, trapped vortex, involute or scroll, rich burn, lean burn, rotating detonation, or pulse detonation configurations, or combinations thereof.

The combustion gases 86 release energy to drive rotation of the high pressure rotor assembly and the low pressure rotor assembly before exhausting from the jet exhaust nozzle section 32. The release of energy from the combustion gases 86 further drives rotation of the fan assembly 14, including the fan blades 42. A portion of the air 74 bypasses the core engine 16 and flows across the fan flow passage 48, such as shown schematically by arrows 78.

It should be appreciated that FIG. 1A depicts and describes a two-stream engine having the fan flow passage 48 and the core flowpath 70. The example depicted in FIG. 1A has a nacelle 44 surrounding the fan blades 42, such as to provide noise attenuation, blade-out protection, and other benefits known for nacelles, and which may be referred to herein as a "ducted fan," or the turbofan gas turbine engine 10 may be referred to as a "ducted engine."

FIG. 1B provides a schematic cross-sectional view of an example open-rotor turbine engine according to one example of the present disclosure. Particularly, FIG. 1B provides an aviation three-stream turbofan engine herein referred to as "three-stream engine 100". The three-stream engine 100 of FIG. 1B can be mounted to an aerial vehicle, such as a fixed-wing aircraft, and can produce thrust for propulsion of the aerial vehicle. The architecture of the three-stream engine 100 provides three distinct streams of thrust-producing airflow during operation. Unlike the turbofan gas turbine engine 10 shown in FIG. 1A, the three-stream engine 100 includes a fan that is not ducted by a nacelle or cowl, such that it may be referred to herein as an "unducted fan," or the three-stream engine 100 may be referred to as an "unducted engine."

For reference, the three-stream engine 100 defines an axial direction A, a radial direction R, and a circumferential direction C. Moreover, the three-stream engine 100 defines a longitudinal or axial centerline axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The three-stream engine 100 extends between a forward end 114 and an aft end 116, e.g., along the axial direction A.

The three-stream engine 100 includes a core engine 120 and a fan section 150 positioned upstream thereof. Generally, the core engine 120 includes, in serial flow order, a compressor section, a combustion section, a turbine section, and an exhaust section. Particularly, as shown in FIG. 1B, the core engine 120 includes a core cowl 122 that defines a core inlet 124. The core cowl 122 further encloses a low pressure system and a high pressure system. In certain examples, the core cowl 122 may enclose and support a booster or low pressure compressor 126 for pressurizing the air that enters the core engine 120 through core inlet 124. A high pressure compressor 128 receives pressurized air from the low pressure compressor 126 and further increases the pressure of the air. The pressurized air stream flows downstream to a combustor 130 where fuel is injected into the pressurized air stream and ignited to raise the temperature and energy level of the pressurized air. It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The low pressure shaft 138 is coaxial with the high pressure shaft 136 in this example. After driving each of the high pressure turbine 132 and the low pressure turbine 134, the combustion products exit the core engine 120 through a core exhaust nozzle 140 to produce propulsive thrust. Accordingly, the core engine 120 defines a core flowpath or core duct 142 that extends between the core inlet 124 and the core exhaust nozzle 140. The core duct 142 is an annular duct positioned generally inward of the core cowl 122 along the radial direction R.

The fan section 150 includes a fan 152, which is the primary fan in this example. For the depicted example of FIG. 1B, the fan 152 is an open rotor or unducted fan. However, in other examples, the fan 152 may be ducted, e.g., by a fan casing or nacelle circumferentially surrounding the fan 152. As depicted, the fan 152 includes an array of fan blades 154 (only one shown in FIG. 1B). The fan blades 154 are rotatable, e.g., about the longitudinal axis 112. As noted above, the fan 152 is drivingly coupled with the low pressure turbine 134 via the low pressure shaft 138. The fan 152 can be directly coupled with the low pressure shaft 138, e.g., in a direct-drive configuration. Optionally, as shown in FIG. 1B, the fan 152 can be coupled with the low pressure shaft 138 via a speed reduction gearbox 155, e.g., in an indirect-drive or geared-drive configuration.

Moreover, the fan blades 154 can be arranged in equal spacing around the longitudinal axis 112. Each of the fan blades 154 has a root and a tip and a span defined therebetween. Each of the fan blades 154 defines a respective central blade axis 156. For this example, each of the fan blades 154 of the fan 152 is rotatable about its respective central blade axis 156, e.g., in unison with one another. One or more actuators 158 can be controlled to pitch each of the fan blades 154 about each respective central blade axis 156. However, in other examples, each of the fan blades 154 may be fixed or unable to be pitched about its respective central blade axis 156.

The fan section 150 further includes a fan guide vane array 160 that includes a plurality of fan guide vanes 162 (only one shown in FIG. 1B) disposed around the longitudinal axis 112. For this example, the fan guide vanes 162 are not rotatable about the longitudinal axis 112. Each of the fan guide vanes 162 has a root and a tip and a span defined therebetween. The fan guide vanes 162 may be unshrouded as shown in FIG. 1B or may be shrouded, e.g., by an annular shroud spaced outward from the tips of the fan guide vanes 162 along the radial direction R. Each of the fan guide vanes 162 defines a respective central blade axis 164. For this example, each of the fan guide vanes 162 of the fan guide vane array 160 is rotatable about its respective central blade axis 164, e.g., in unison with one another. One or more actuators 166 can be controlled to pitch the fan guide vanes 162 about each respective central blade axis 164. However, in other examples, each of the fan guide vanes 162 may be fixed or unable to be pitched about its respective central blade axis 164. The fan guide vanes 162 are mounted to a fan cowl 170.

As shown in FIG. 1B, in addition to the fan 152, which is unducted, a ducted fan 184 is included aft of the fan 152, such that the three-stream engine 100 includes both a ducted and an unducted fan that both serve to generate thrust through the movement of air without passage through core engine 120. The ducted fan 184 is shown at about the same axial location as the fan guide vanes 162, and radially inward of the fan guide vanes 162. Alternatively, the ducted fan 184 may be between the fan guide vanes 162 and core duct 142 or be farther forward of the fan guide vanes 162. The ducted fan 184 may be driven by the low pressure turbine 134 (e.g., coupled to the low pressure shaft 138), or by any other suitable source of rotation, and may serve as the first stage of booster or may be operated separately.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define a fan flowpath or fan duct 172. Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially extending, circumferentially-spaced stationary struts 174 (only one shown in FIG. 1B). The stationary struts 174 may each be aerodynamically contoured to direct air flowing thereby. Other struts in addition to the stationary struts 174 may be used to connect and support the fan cowl 170 and/or core cowl 122. In many examples, the fan duct 172 and the core cowl 122 may at least partially co-extend (generally axially) on opposite sides (e.g., opposite radial sides) of the core cowl 122. For example, the fan duct 172 and the core cowl 122 may each extend directly from a leading edge 144 of the core cowl 122 and may partially co-extend generally axially on opposite radial sides of the core cowl 122.

The three-stream engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or the leading edge 144 of the core cowl 122. The inlet duct 180 is wider than the core duct 142 along the radial direction R. The inlet duct 180 is also wider than the fan duct 172 along the radial direction R.

FIG. 1C shows an example of a turboshaft engine 190. The turboshaft engine 190 includes a compressor 193, a rotatably mounted stator casing 197, a combustor 194, and a high pressure turbine 192 all arranged in a serial flow relationship along a centerline axis "A". These components constitute a main core of the turboshaft engine 190. The compressor 193 compresses air that is passed into the combustor 194 where fuel is introduced and burned to generate combustion gas. The combustion gas is discharged to the high pressure turbine 192, where the gas expands to extract energy. The high pressure turbine 192 drives a shaft 195 connected to the compressor 193. Pressurized air leaves the high pressure turbine 192 and enters a low pressure turbine 196 where the gas expands further to extract energy. The low pressure turbine 196 is connected to a gearbox or other mechanical load 198 and drives the load accordingly.

FIGS. 1A, 1B, and 1C are intended as illustrative examples only. The presently disclosed technology can be applied to a variety of engines such as a turboshaft engine, a turbofan engine, a ducted engine, an unducted engine, a turboprop engine, a turbojet engine, etc. The examples herein serve to demonstrate potential uses and configurations but are not limited thereto.

As described further below, FIG. 2A. is an example of a non-integral air-cooled oil cooler, which is also referred to as a brick-type air-cooled oil cooler. In this figure, turbomachinery with an inlet is connected to an accessory gear box (AGB). A non-integral air-cooled oil cooler system includes the AGB connected to an AGB driven fan and a heat exchanger. The system circulates lubricating and cooling oil to ensure proper movement and cooling of machinery components. The oil is supplied by a lube and scavenge system and is warmed through lubricating and cooling machinery and delivered to the heat exchanger at a hot oil inlet. In some examples, the heat generation rate can be as low as 100 British thermal unit (Btu)/minute, while in others it can be as high as 2000 Btu/min. Depending on flow rate, the heat generation rate in the example can increase oil temperature by as much as 100 degrees Fahrenheit. Cold air enters the heat exchanger, where the warmed oil is cooled and the cold air is warmed. In some examples, the oil can be cooled by as much as 100 degrees Fahrenheit. The AGB driven fan then pushes the warmed air out of the system, and the cold oil leaves the heat exchanger at the cold oil outlet. Such air-cooled oil coolers make use of driven fans to be able to pull the cold air in and push the warmed air out.

Figure 2A:
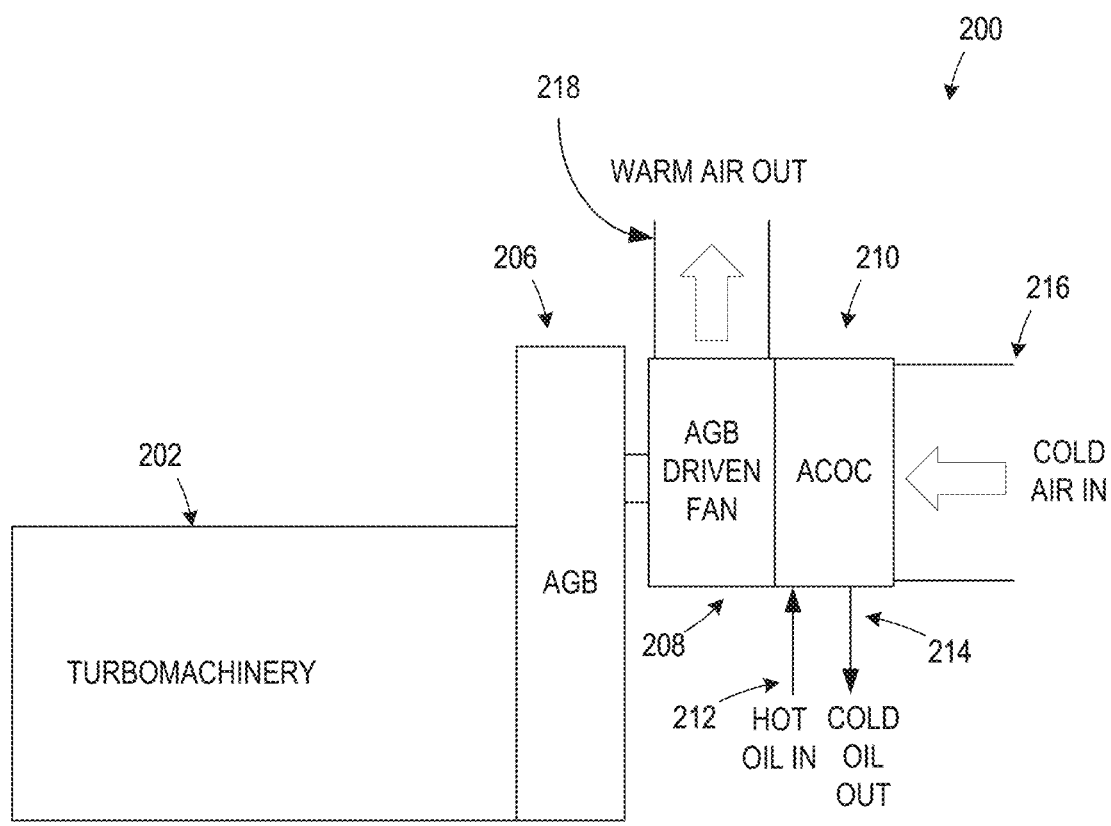
FIG. 2A is a block diagram of a non-integral air-cooled oil cooler system.

FIG. 2A shows an example of a non-integral air-cooled oil cooler system 200. A turbomachinery 202 is attached to an accessory gearbox 206, which is driving an accessory gearbox (AGB) driven fan 208 connected to a heat exchanger 210. The heat exchanger, or air cooled oil cooler (ACOC), 210 and accessory gearbox driven fan 208 in combination make up the non-integral air-cooled oil cooler system 200. The non-integral air-cooled oil cooler system 200 uses the accessory gearbox driven fan 208 to pull cold air in through an air inlet duct 216. The heat exchanger 210 is in line with an oil lube and scavenge system which enables hot oil to be pumped to the heat exchanger 210 through a hot oil inlet 212. The cold air cools the hot oil, and the hot oil warms the cold air. In some examples, the oil can be cooled by as much as 100 degrees Fahrenheit, whereas the air can be heated by anywhere from two to ten degrees Fahrenheit. The cooled oil continues circulating through the lube and scavenge system by travelling out of the heat exchanger 210 through a cold oil outlet 214, while the warmed air is pushed out an outlet duct 218 by the accessory gearbox driven fan 208. By design of the accessory gearbox 206, accessory gearbox driven fan 208, and heat exchanger 210 combination, multiple components make up the non-integral air-cooled oil cooler system 200 to cause the hot oil to be cooled. By having multiple components, added weight, cost, and risk of failure is introduced into the non-integral air-cooled oil cooler system 200. Additionally, the functionality of the accessory gearbox driven fan 208 draws power from and put more load on the accessory gearbox 206 and turbomachinery 202. In some examples, the power draw can reach as much as 2 horsepower.

Figure 2B:
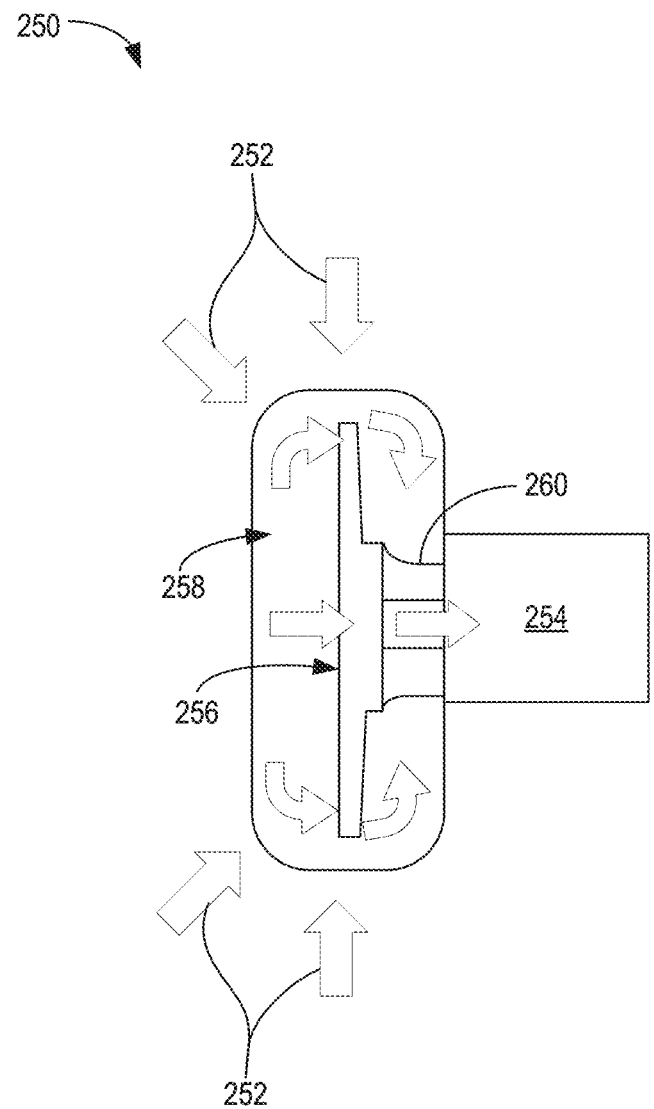
FIG. 2B is a diagram showing an example integral air-cooled oil cooler system.

Example air-cooled oil coolers disclosed herein are integral to leverage existing turbomachinery components. An example integral air-cooled oil cooler system 250 is shown in FIG. 2B. A downstream compressor 254 generates airflow 252. The airflow 252 is pulled into the system 250 and circulates around an inlet plenum 258 at a first end of an inlet frame flow path. By circulating around the inlet plenum 258, the airflow 252 cools the surfaces of an air-cooled oil cooler 256. The airflow 252 continues along a flow path (also referred to as an inlet frame flow path) into air inlet passages 260, until the airflow 252 reaches the compressor 254. By inserting the air-cooled oil cooler 256 into the path of air flow 252, no additional ducting, accessory driven gearbox, or other components need to be introduced for heat exchange and associated cooling. The air-cooled oil cooler 256 exchanges heat as the airflow 252 generated by the compressor 254 is pulled over the air-cooled oil cooler 256.

Figure 3A:
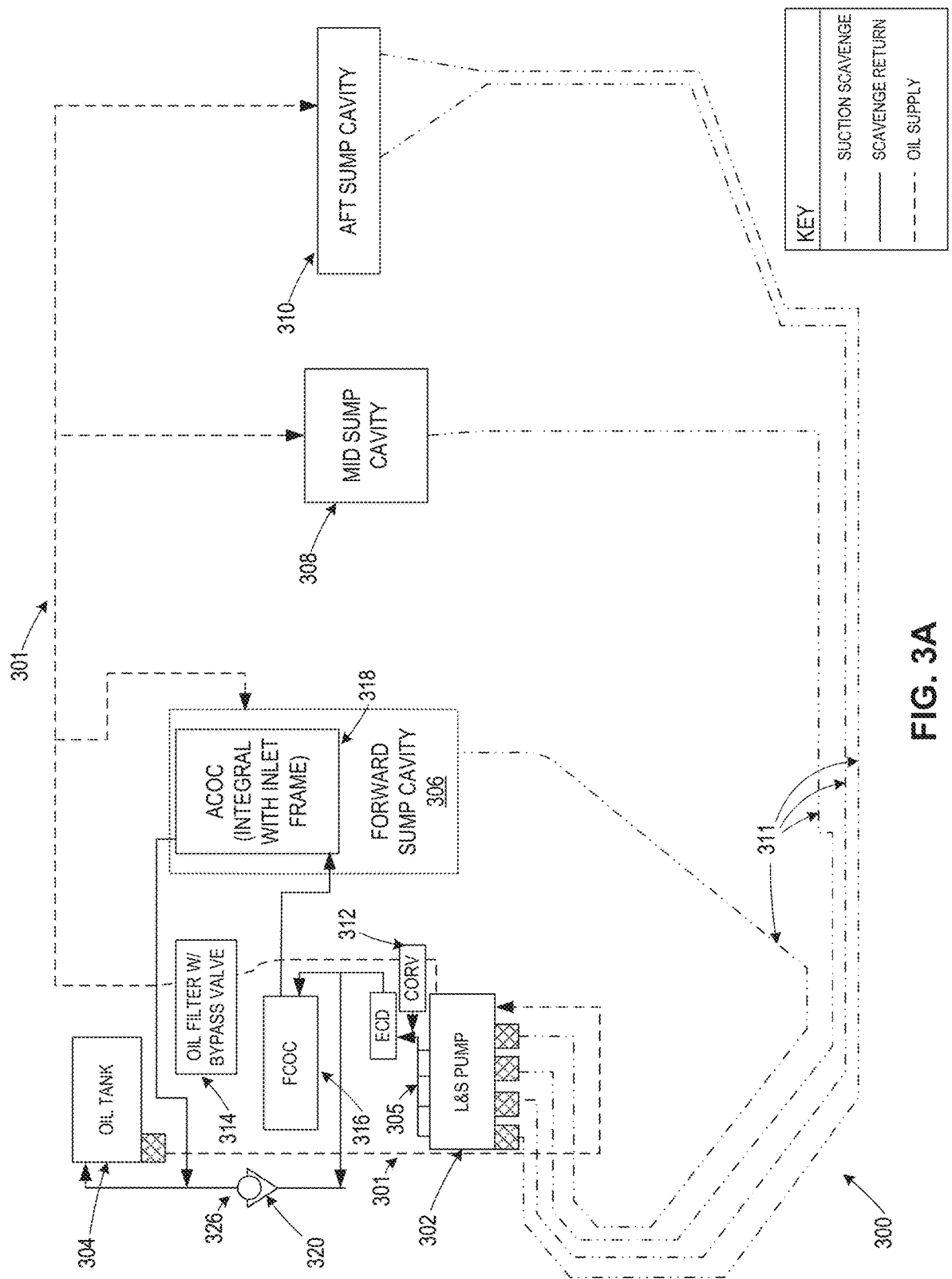
FIG. 3A is an example schematic of oil flow through an integral air-cooled oil cooler without a thermostatic bypass valve.

Example integral air-cooled oil coolers disclosed herein are implemented as a component in an oil circulation system used to provide lubrication to a plurality of cavities and to scavenge used oil from the cavities. For example, FIG. 3A shows a schematic of such a lube and scavenge system. In brief, lubricating and cooling oil is pumped via a lube and scavenge pump from an oil tank and supplied to a plurality of sump cavities. The oil is used for lubricating and cooling engine components, whereupon the oil is heated. In some examples, the oil is heated by as much as 100 degrees Fahrenheit. The lube and scavenge pump then suctions the oil from the sump cavities and supplies the oil to a fuel-cooled oil cooler and/or an air-cooled oil cooler connected to the oil tank. This suction and supply can be bypassed via an oil cooler bypass pressure valve which enables oil to directly flow to the oil tank when the pressure is higher than a pre-determined threshold defined by the system owner. In one example, a system owner defines a pressure threshold to be approximately 80 psid.

Figure 3B:
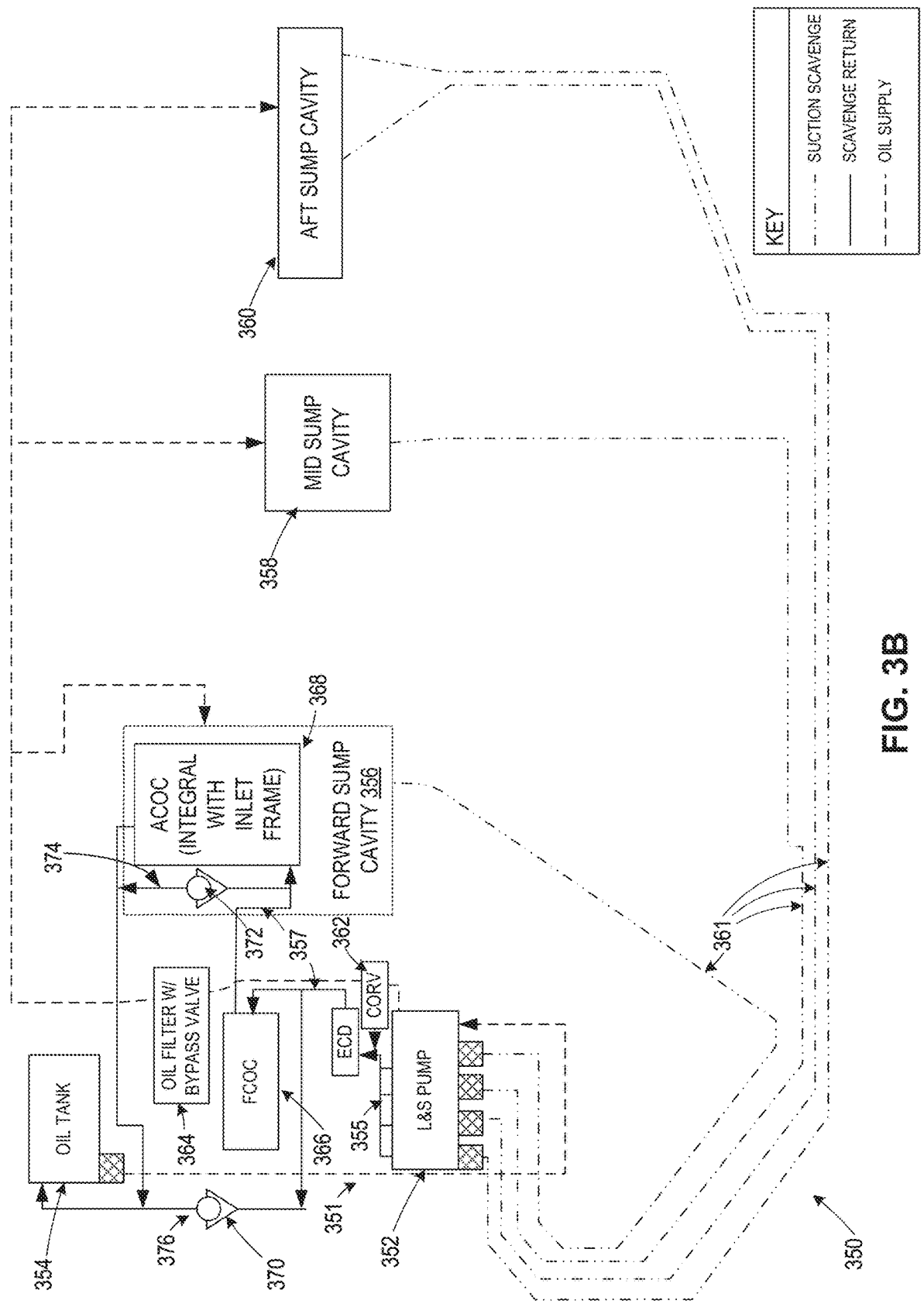
FIG. 3B is an example schematic of oil flow through an integral air-cooled oil cooler with a thermostatic bypass valve.

In the disclosed air-cooled oil cooler herein, the oil scavenge system has a thermostatic valve and a bypass pathway to bypass fluid flow to the air-cooled oil cooler when the oil temperature is lower than a pre-determined threshold as defined by the system owner. In some examples, the pre-determined threshold is defined as from 140 to 160 degrees Fahrenheit. In other examples, the threshold is set at or around 220 degrees Fahrenheit. FIG. 3B shows the presence of a thermostatic bypass valve. The thermostatic bypass valve determines when additional oil cooling capacity is to be provided. Thrust-specific fuel consumption is therefore improved through the implementation of such a thermostatic valve when additional oil cooling capacity is not provided by the air-cooled oil cooler and the bypass pathway is utilized.

Referring in more detail to FIG. 3A, an example lube and scavenge system 300 schematic is shown in which oil is supplied from an oil tank 304 and pumped by a lube and scavenge pump 302. The oil is pumped to an oil filter 314. In some instances, the oil is pumped from a lube and scavenge system oil supply line 301 through a cold oil relief valve 312, to a lube and scavenge system scavenge return line 305. The supply oil passes through the oil filter 314 to a forward sump cavity 306, a mid sump cavity 308, and/or an aft sump cavity 310. In this example, the air-cooled oil cooler 318 is integrated with an inlet frame which includes the forward sump cavity 306. In this example, the lube and scavenge system 300 starts with the lube and scavenge pump 302, pulling oil from the mid sump cavity 308, the aft sump cavity 310, and the forward sump cavity 306 through scavenge lines 311. The oil flows from a common scavenge return line 305 to a fuel cooled oil cooler 316. In some instances, the pressure is higher than a pre-determined threshold defined by the system owner and triggers the oil to pass through an oil cooler bypass pressure valve 320 down a scavenge return line 326 to the oil tank 304 instead of the fuel cooled oil cooler 316 and downstream air-cooled oil cooler 318. In this example, the lube and scavenge system 300 continues from the fuel cooled oil cooler 316 to the air-cooled oil cooler 318. In this example, the lube and scavenge system then continues from the air-cooled oil cooler 318 to the oil tank 304.

Referring now to FIG. 3B, a similar lube and scavenge system 350 schematic is shown where oil is supplied from an oil tank 354 through an oil supply line 351 and pumped by a lube and scavenge pump 352. The oil is pumped through a cold oil relief valve 362 to an oil filter with a bypass valve 364. The oil passes through the oil filter 364 to a forward sump cavity 356, a mid sump cavity 358, or an aft sump cavity 360. In this example, an air-cooled oil cooler 368 is integrated with the inlet frame which includes the forward sump cavity 356. In this example, the lube and scavenge system 300 starts in the lube and scavenge pump 352, pulling oil from the forward sump cavity 356, mid sump cavity 358, and aft sump cavity 360 through scavenge lines 361. The oil flows from a common scavenge return line 355 through to a fuel-cooled oil cooler 366. In some instances, the pressure is higher than a pre-determined threshold as defined by the system owner and triggers the oil to pass through an oil cooler pressure bypass valve 370 to the oil tank 354 instead of the fuel cooled oil cooler 366 and downstream air-cooled oil cooler 368. In this example, the lube and scavenge system 350 continues from the fuel cooled oil cooler 366 to an air-cooled oil cooler 368. In some instances, the temperature is lower than a pre-determined threshold as defined by the system owner and triggers the oil to pass through an oil cooler bypass temperature valve 372, also called a thermostatic bypass valve, instead of the air-cooled oil cooler 368. In this example, the lube and scavenge system 350 then continues from the air-cooled oil cooler 368 to the oil tank 354.

In a closed configuration, the example thermostatic bypass valve 372 enables a lubricating and cooling fluid, such as oil, fuel, supercritical carbon dioxide (sCO$_2$), synthetic fluids, or air, to be circulated to the air-cooled oil cooler 368 for heat dissipation as disclosed herein. In an open configuration, the thermostatic bypass valve 372 allows the lubricating and cooling fluid to bypass the air-cooled oil cooler 368 and proceed down a thermostatic bypass pathway 374. Bypassing the air-cooled oil cooler 368 improves thrust-specific fuel consumption by enabling a shorter circuit that reduces heating of the inlet air, for example.

Figure 4:
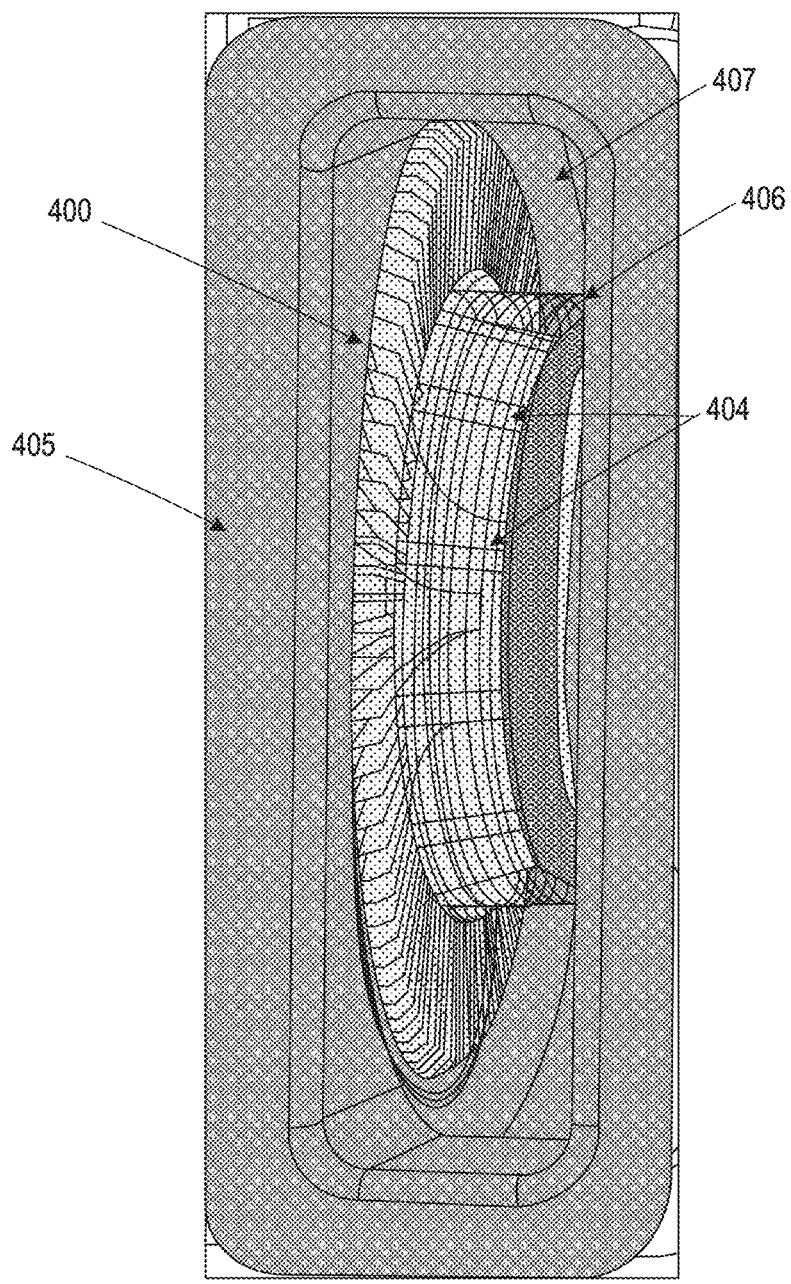
FIG. 4 is a side view of an air-cooled oil cooler integral to the engine inlet frame.

FIG. 4 shows an example of an integral air-cooled oil cooler 400 behind an engine inlet duct 405. A downstream compressor (shown in FIG. 2B) creates a main core airflow. A foreign object debris screen 406 is placed in the main core airflow to screen obstructions and other foreign object debris from entering an air inlet passage. In this example, air is pulled by the downstream compressor (shown in FIG. 2B) over the frame surfaces in the shown cavity, referred to as an inlet plenum 407, with a fluid core embedded into the inlet frame. In this example, a plurality of heat rejection fins (shown later in FIG. 6B) protrude from the fluid core (shown later in FIG. 6A and FIG. 6B) into the inlet plenum to increase the surface area of exposed oil cooled by the airflow in the inlet plenum 407 and reduce pressure loss of the oil are connected to the fluid core. The heat rejection fins may be constructed of the same material as the inlet frame. In this example, the heat rejection fins are constructed of aluminum. In this example, the air continues from the inlet plenum 407 into a plurality of air inlet passages created by a plurality of struts 404, acting as a support structure, housing a portion of the fluid core. The air inlet passages are connected to the downstream compressor (as shown previously in FIG. 2B).

Figure 5A:
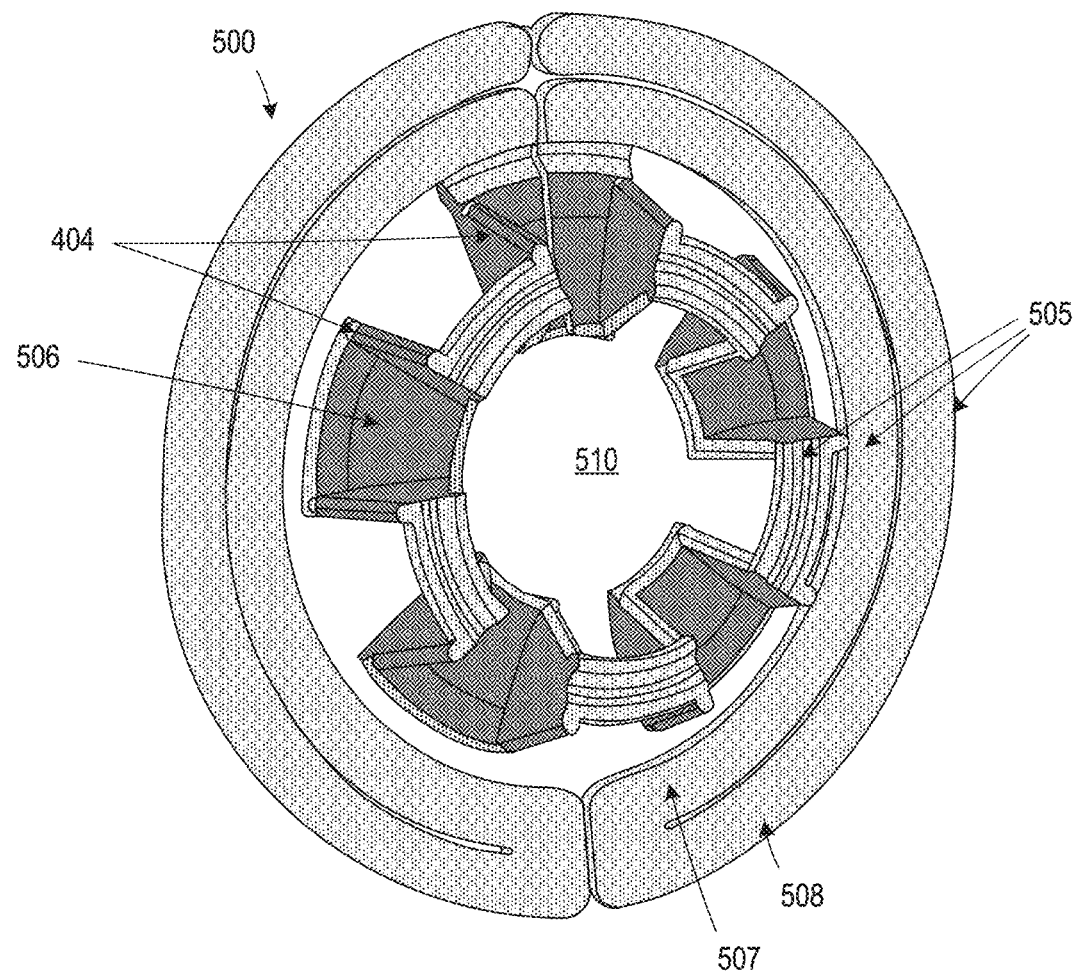
FIG. 5A is an isometric aft view looking forward of a fluid core of an integral air-cooled oil cooler.
Figure 5B:
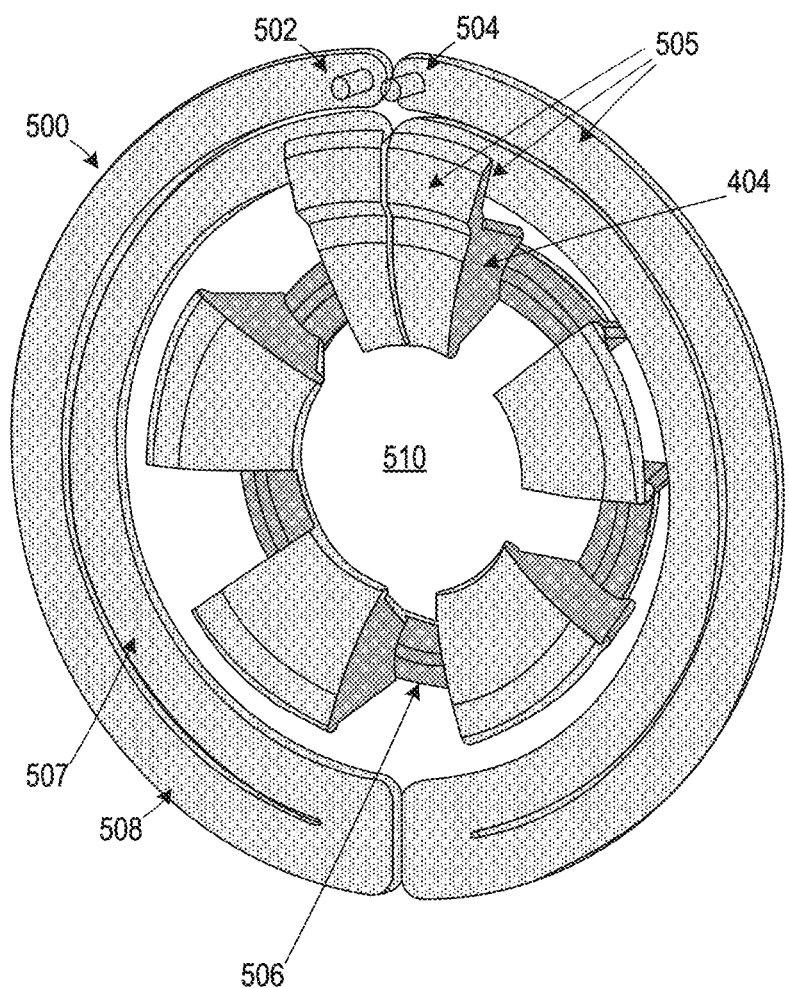
FIG. 5B is an isometric forward view looking aft of a fluid core of an integral air-cooled oil cooler.

FIGS. 5A and 5B are forward-looking and aft-looking views, respectively, showing an example of a fluid core 500 of the example integral air-cooled oil cooler 400. In this example, fluid core 500 has a serpentine pathway 505 to retain oil or another lubricating and cooling fluid. The example serpentine pathway 505 begins with a fluid inlet 502 (FIG. 5B) where lubricating oil enters the fluid core 500. The oil is circumferentially routed and is subjected to the serpentine pathway 505 arranged around a circle with the circle being around an inner body 510. The example serpentine pathway 505 includes an inner portion 507 and outer portion 508 of a circle as well as through air inlet passages 506. The oil flows circumferentially along the outer portion 508 of the serpentine pathway 505, enters the inner portion 507 of the serpentine pathway 505 by heading radially inward, then flows circumferentially through the serpentine pathway 505 before entering the air inlet passage walls 506. There, the example oil is flowed through a portion of the serpentine pathway 505 that is connecting the air inlet passage walls 506 and the plurality of struts 404. At the end of the example air inlet passage walls 506 is another circumferential serpentine path, starting with the inner portion 507. Oil flows circumferentially before routing radially outward to the outer portion 508, where the oil continues to flow circumferentially around the circle to a fluid outlet 504.

Figure 6A:
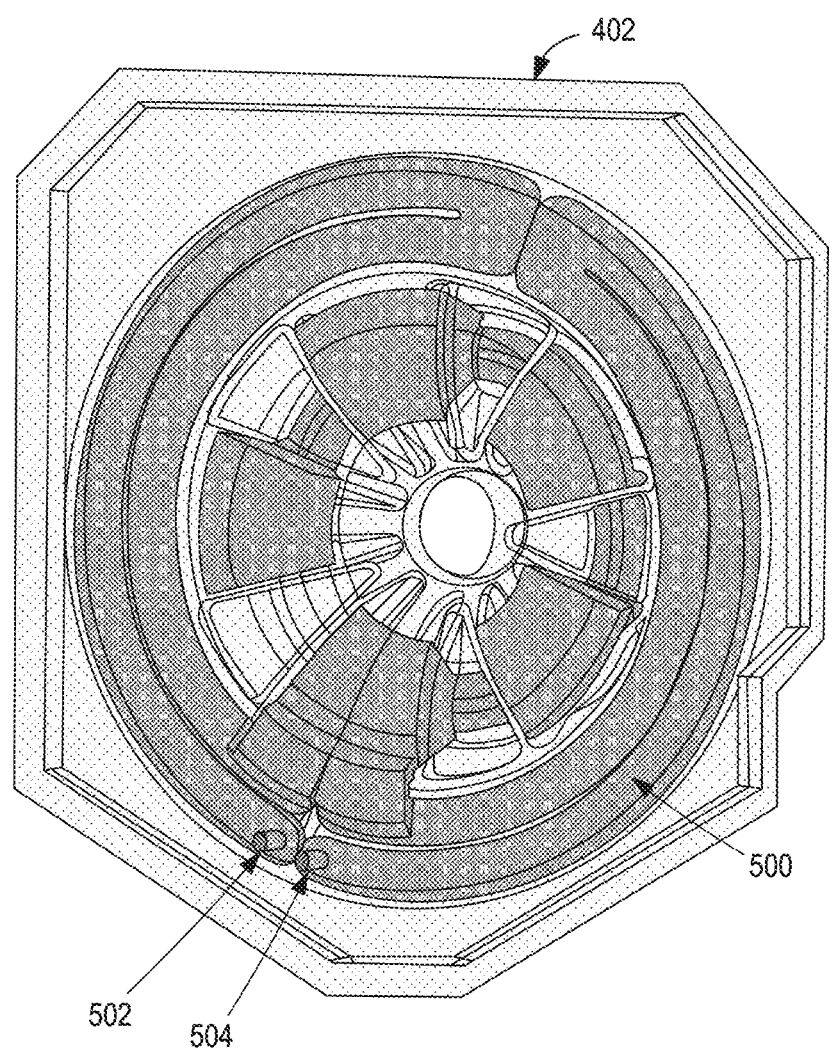
FIG. 6A is an isometric view of a fluid core within an engine inlet frame from a forward viewpoint looking aft.
Figure 6B:
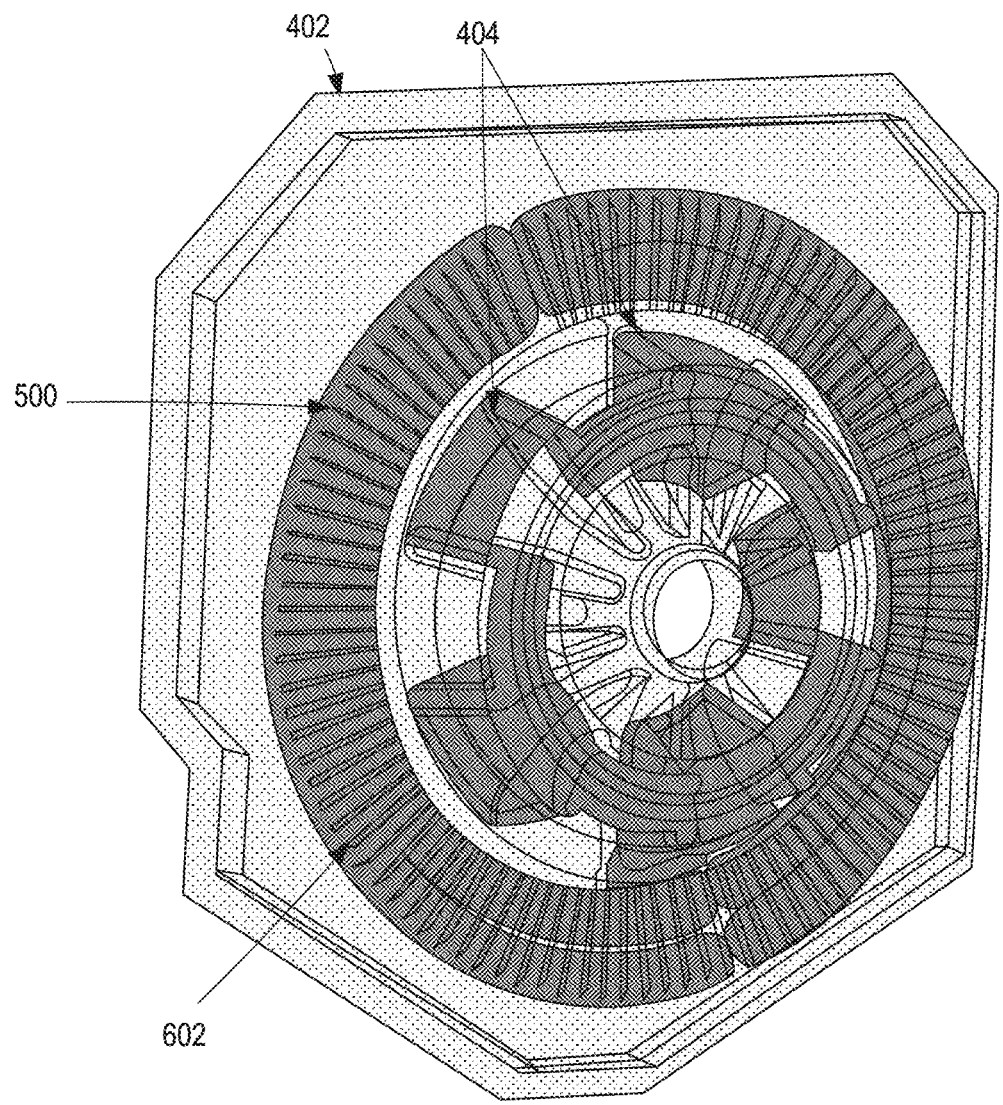
FIG. 6B is an isometric view of a fluid core within an engine inlet frame from an aft viewpoint looking forward.

Referring now to FIGS. 6A and 6B which are aft-looking and forward-looking views, respectively, the example fluid core 500 as integrated into an engine inlet frame 402 of an engine is shown. Oil is flowed through the example fluid core 500. In this example, a plurality of heat rejection fins 602 (FIG. 6B) are coupled to the fluid core, in a manner to protrude from a back side exterior surface to subject the oil approximately 25% more cooling overall without increasing pressure loss as the oil flows along the oil pathway.

The example of FIGS. 6A and 6B shows an implementation of the example integral air-cooled oil cooler 400 with heat rejection fins 602 (FIG. 6B). Additionally, disclosed herein is an example serpentine fluid pathway constituting a fluid core 500. The combination of the serpentine fluid pathway of the fluid core 500 and heat rejection fins 602 provides a mechanism for heat dissipation. However, an extended pathway can be configured without heat rejection fins, with different contouring of the serpentine oil pathway, and/or other shaping for heat dissipation.

Figure 7:
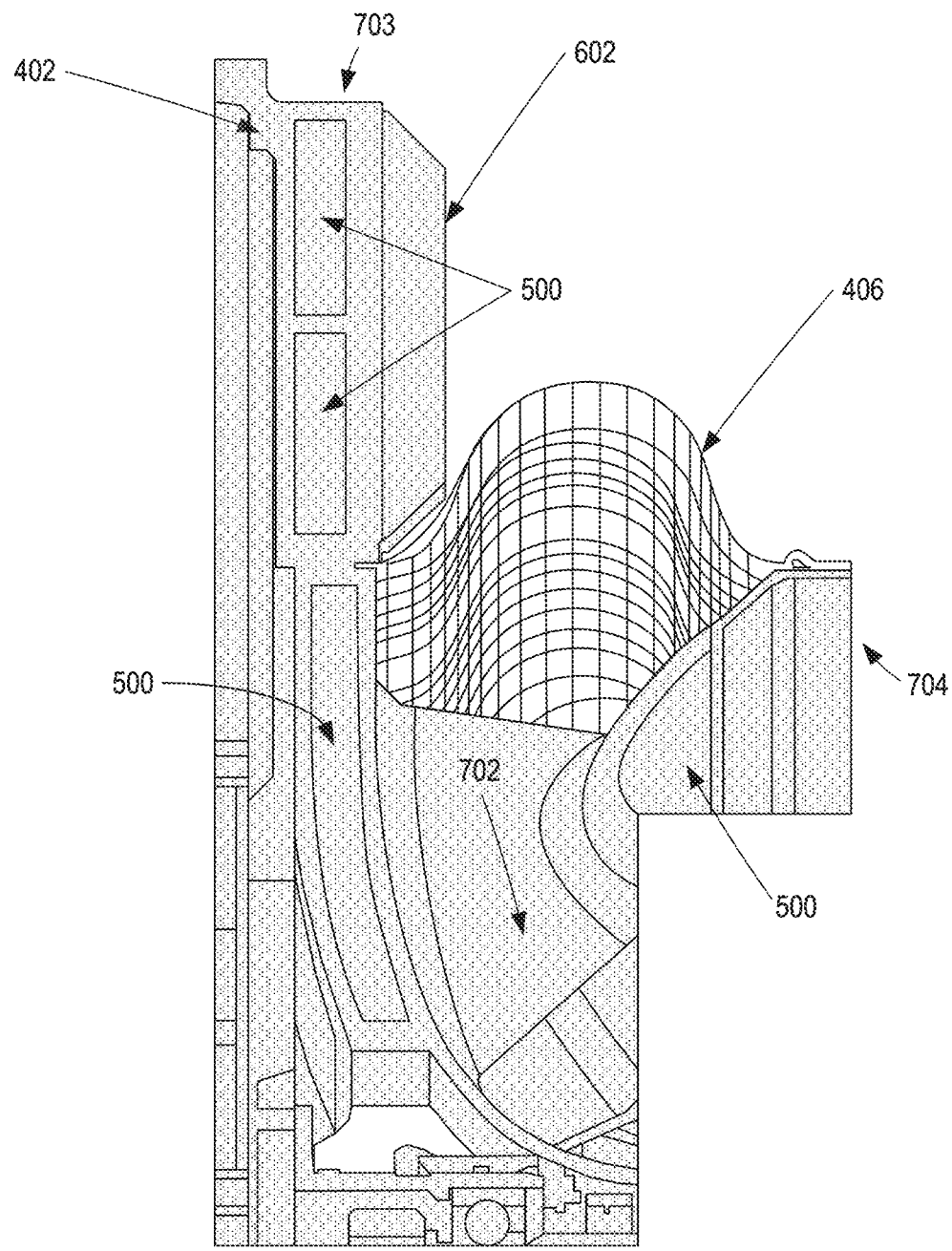
FIG. 7 is a cross section view of an integral air-cooled oil cooler integral to an engine inlet frame.

FIG. 7 shows a cross section of the example engine inlet frame 402 (as shown previously in FIG. 6A) with the integral air-cooled oil cooler 400 (as shown previously in FIG. 4). Air enters an inlet duct 405 (as shown earlier in FIG. 4), flows in between an inner body 703 and an outer body 704, around the inlet plenum 407 (as shown earlier in FIG.

4) of the engine inlet frame 402 to contact the integral air-cooled oil cooler 400 and enters an air inlet passage 702 supported by a plurality of struts (shown in FIG. 4) built partially into the inner body 703. In the process, oil contained within the fluid core 500 is cooled with the assistance of the plurality of heat rejection fins 602. The foreign object debris screen 406 helps stop debris from entering the air inlet passage 702. The air inlet passage 702 is shown where the air travels to a downstream compressor (shown in FIG. 2B). As shown, the fluid core 500 exists not only as built inside of the engine inlet frame 402, but also as shown in the walls of the air inlet passage 702. Integrating the air-cooled oil cooler 400 into the engine inlet frame 402 enables the ambient air entering the air inlet passage 702 to cool oil in the fluid core 500.

Figure 8:
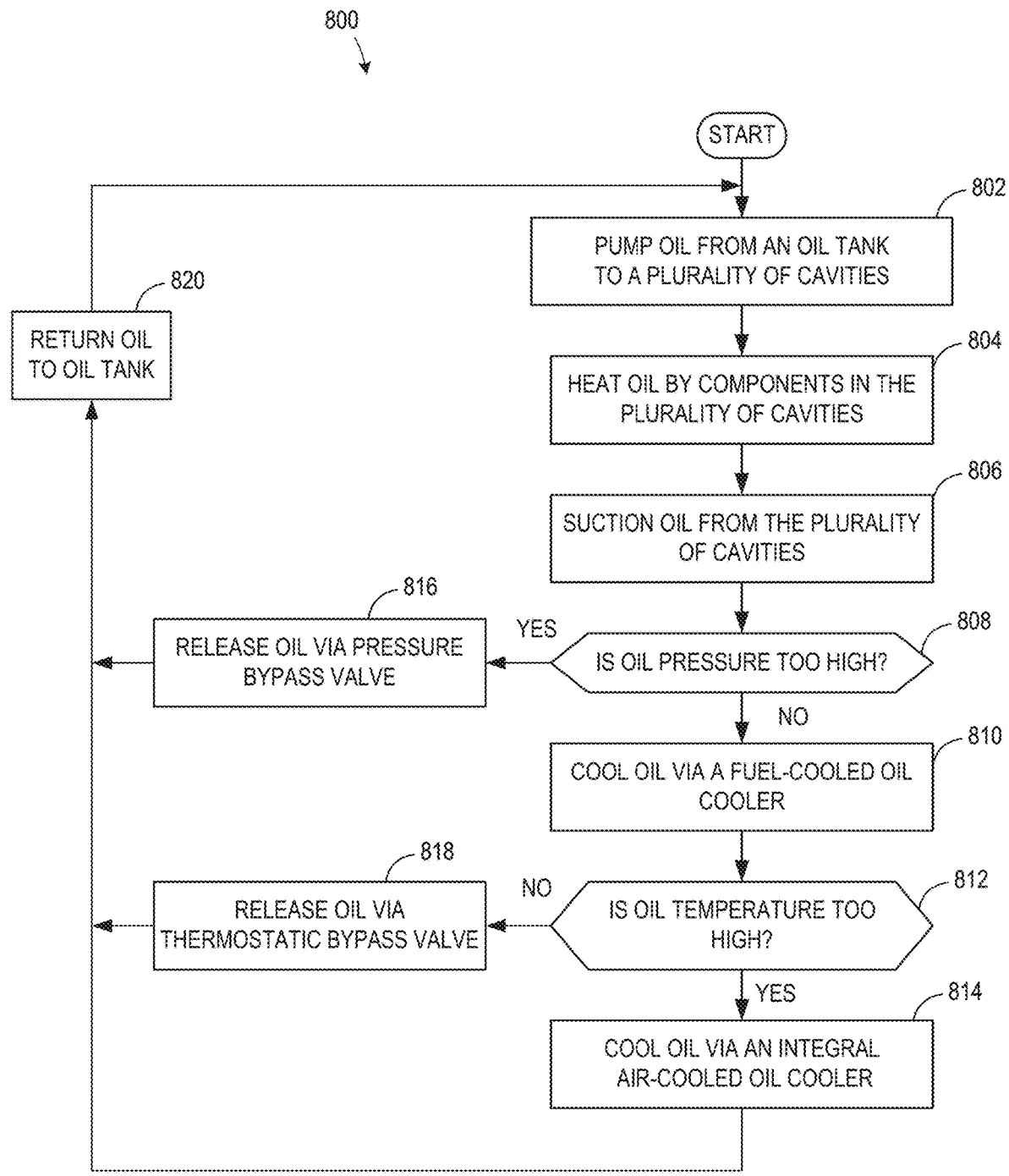
FIG. 8 is a flowchart depicting control of oil flow through an example gas-turbine engine.

FIG. 8 highlights a flow of oil 800 through an example turbine engine and more specifically, a closed-rotor turbofan engine, such as the turbofan gas turbine engine 10 of FIG. 1A, an open-rotor engine, such as the three-stream engine 100 of FIG. 1B, or a turboshaft engine, such as the turboshaft engine 190 of FIG. 1C.

In a lube and scavenge system, a fluid is pumped from a fluid tank through a relief valve to a plurality of cavities. In the example of FIG. 3B, a flow of oil starts with oil in an oil tank such as the oil tank 354. An example lube and scavenge system 350 is connected to the oil tank 354, and a lube and scavenge pump 352 begins pumping oil from an oil tank 354. The oil travels through the lube and scavenge pump 352 and to a plurality of sump cavities with engine components such as forward sump cavity 356, mid sump cavity 358, and aft sump cavity 360 (Block 802).

The fluid is subsequently heated by engine components such as bearings, seals, gears, etc. within the plurality of cavities. In the example of FIG. 3B, the engine components within the plurality of cavities 356, 358, 360 has various functions with various articulating components. The oil lubricates and cools the components in the plurality of cavities 356, 358, 360. By lubricating and cooling the articulating components, the oil is heated (Block 804).

Fluid is then suctioned from the plurality of cavities. In the example of FIG. 3B, the lube and scavenge system 350 is connected in a second manner to the engine components within the plurality of cavities 356, 358, 360. While still supplying lubricating and cooling oil to the plurality of cavities 356, 358, 360, the lube and scavenge system 350 is also suctioning the used, heated oil from the plurality of cavities 356, 358, 360 to make a circuit. The heated oil is then suctioned from the plurality of cavities 356, 358, 360 through the scavenge lines 361 (Block 806).

The fluid is then returned along the lube and scavenge system return line. The lube and scavenge system return line splits to have a lube and scavenge system main return pathway (also referred to as a main flow path) and a parallel pressure bypass pathway, controlled by a pressure bypass valve. For example, once the oil is suctioned from the example plurality of cavities 356, 358, 360, the heated oil passes through the lube and scavenge pump 352. After the oil passes through the lube and scavenge pump 352, the oil continues down a main lube and scavenge system return pathway 357, which branches off to create a parallel bypass pressure pathway 376 with a pressure bypass valve 370. The pressure bypass valve 370 determines whether or not the oil pressure is too high (Block 808).

If the fluid pressure is too high, the pressure bypass valve opens to allow fluid flow. For example, the pressure bypass valve 370 of FIG. 3B releases the oil to the bypass pressure pathway 376 (Block 816).

The fluid is then returned via the bypass pressure pathway to the fluid tank. For example in FIG. 3B, the oil then returns to the example oil tank 354, whereupon the oil is recirculated (Block 820).

If the fluid pressure does not trigger the pressure bypass valve, the fluid continues down the main lube and scavenge system pathway to a fuel-cooled oil cooler. In the example from FIG. 3B, if the oil pressure is determined to not be too high then the oil proceeds down the example main lube and scavenge system return pathway 357. The example oil travels to a fuel-cooled oil cooler 366. The oil is cooled by the example fuel-cooled oil cooler 366 (Block 810).

After the fluid is cooled in the fuel-cooled oil cooler, the fluid flows down the lube and scavenge system scavenge return line. The scavenge return line splits again to continue the main lube and scavenge system return pathway and to branch a thermostatic bypass pathway, controlled by a thermostatic bypass valve, in parallel. In the example from FIG. 3B, the oil is cooled by the example fuel-cooled oil cooler 366, the oil proceeds down the main lube and scavenge system return pathway 357 which is in parallel with a thermostatic bypass pathway 374. The thermostatic bypass pathway 374 is enabled by a thermostatic bypass valve 372 that determines if the oil temperature is too high (Block 812).

The thermostatic bypass valve determines if the temperature of the fluid is below a pre-determined threshold as defined by the system owner. If the fluid is below the pre-determined threshold, the thermostatic bypass valve opens and allows the fluid to flow down the thermostatic bypass pathway. For example in FIG. 3B, if the oil is cooled to a value below the pre-determined threshold by the fuel-cooled oil cooler 366, the thermostatic bypass valve 372 releases the oil to the thermostatic bypass pathway 374 (Block 818).

The fluid is then returned via the thermostatic bypass pathway to the fluid tank. For example in FIG. 3B, the oil then returns to the oil tank 354, whereupon the oil is recirculated (Block 820).

If the fluid is not below the temperature threshold for the thermostatic bypass valve, the fluid continues along the main lube and scavenge system return pathway to an integral air-cooled oil cooler. In the example of FIG. 3B, if the oil is not sufficiently cooled by the fuel-cooled oil cooler 366, the thermostatic bypass valve 372 remains closed. The example oil travels further along the main lube and scavenge system return pathway 357 to an example integral air-cooled oil cooler 368. The oil is cooled via the air-cooled oil cooler 368 (Block 814).

The fluid is then returned via the main lube and scavenge system return pathway to the fluid tank for recirculation. In the example of FIG. 3B, after the oil is cooled via the air-cooled oil cooler 368, the oil returns to the oil tank 354, whereupon the oil is recirculated (Block 820).

By integrating the example air-cooled oil cooler into the engine inlet frame, the downstream compressor continues to pull air and no additional accessory gearbox driven fan is necessary for exchanging heat. Oil from the example lube and scavenge system is routed near the main core of the engine to the fluid core of the air-cooled oil cooler. In some examples, a thermostatic valve is present to bypass the air-cooled oil cooler which increases thrust-specific fuel consumption.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Additionally, although individual features may be included in different examples or claims, these may possibly be combined, and the inclusion in different examples or claims does not imply that a combination of features is not feasible and/or advantageous.

In operation, the apparatus described above, and their equivalents, use main engine inlet airflow to cool oil from a lube and scavenge system of an engine. The foregoing examples are non-exhaustive and not exclusive of other examples. The foregoing examples enable a method of integrating an air-cooled oil cooler having a fluid core located on other components of an engine. In operation, engine inlet airflow is pulled by a downstream compressor through an air-cooled oil cooler. The integrated air-cooled oil cooler can be incorporated on a scavenger side of the oil circuit, for example. The integrated air-cooled oil cooler could also be incorporated on a supply side of the oil circuit, for example.

From the foregoing, it will be appreciated that example methods, apparatus and articles of manufacture have been disclosed that decrease weight, cost, and power requirement by removing the use of additional components in an engine. An example integral air-cooled oil cooler provides the benefit of heat rejection from an oil system without disrupting airflow through an aircraft engine main core. Additional examples increase thrust-specific fuel consumption by introducing a thermostatic bypass valve.

Example methods, apparatus, systems, and articles of manufacture to integrate air-cooled oil coolers into a gas turbine engine are disclosed herein. Further examples and combinations thereof include the following:

A gas turbine engine comprising an inlet frame including an inlet plenum at a first end of an inlet frame flow path, the inlet frame defining an airflow entrance to a compressor, the compressor to provide an airflow through the inlet frame, a pump to circulate a fluid, a plurality of struts supporting the inlet frame flow path, and a fluid core connected to the pump and built at least partially into the inlet frame of the gas turbine engine, the fluid core to route the fluid through the inlet plenum.

The gas turbine engine of any preceding clause, wherein the fluid core serpentines through the plurality of struts.

The gas turbine engine of any preceding clause, wherein a surface of the fluid core is wetted.

The gas turbine engine of any preceding clause, further including a plurality of heat rejection fins connected to the fluid core.

The gas turbine engine of any preceding clause, wherein the fluid core is a main flow path, the fluid core further including a pressure bypass valve to bypass the main flow path, the pressure bypass valve in line with a bypass pathway, the bypass pathway in parallel to the main flow path.

The gas turbine engine of any preceding clause, wherein the fluid core is a main flow path, the fluid core further including a thermostatic valve to bypass the main flow path, the thermostatic valve in line with a bypass pathway, the bypass pathway in parallel to the main flow path.

The gas turbine engine of any preceding clause, further including a foreign object debris screen to screen obstructions from entering the inlet frame flow path.

The gas turbine engine of any preceding claim, wherein the inlet frame further includes an inner body and an outer body, the inlet frame flow path formed between the inner body and the outer body of the inlet frame to allow air flow to the compressor, the plurality of struts built at least partially into the inner body of the inlet frame to route a fluid through the inlet plenum.

The gas turbine engine of any preceding claim, wherein a surface of the plurality of struts is wetted.

The gas turbine engine of any preceding claim, further including a plurality of heat rejection fins extending into the inlet plenum.

The gas turbine engine of any preceding claim, wherein the inlet frame is an engine inlet frame.

The gas turbine engine of any preceding claims, wherein the pump is a scavenge pump, and wherein the fluid core is connected in serial flow communication with a return line of the scavenge pump.

An inlet frame of a gas turbine engine, the inlet frame comprising an inner body, an outer body, an inlet frame flow path formed between the inner body and the outer body of the inlet frame to allow air flow to a downstream compressor, an inlet plenum at a first end of the inlet frame flow path to facilitate air circulation, and a plurality of struts to support the inlet frame flow path, the plurality of struts built at least partially into the inner body of the inlet frame to route a fluid through the inlet plenum.

The inlet frame of any preceding clause, wherein a surface of the plurality of struts is wetted.

The inlet frame of any preceding clause, further including a plurality of heat rejection fins extending into the inlet plenum.

The inlet frame of any preceding clause, further including a pressure bypass valve to bypass fluid flow to the inlet plenum via a bypass pathway.

The inlet frame of any preceding clause, further including a thermostatic bypass valve to bypass fluid flow to the inlet plenum via a bypass pathway.

The inlet frame of any preceding clause, further including a foreign object debris screen to screen obstructions from entering the inlet frame flow path.

An engine inlet frame apparatus comprising an air inlet passage positioned upstream of a compressor to allow an airflow through the air inlet passage, the air inlet passage having a plenum at a first end to facilitate air circulation around the air inlet passage, a plurality of struts to support the air inlet passage, and a fluid core at least partially built into the engine inlet frame apparatus and connected to the plenum, the fluid core to route a fluid through the plenum.

The engine inlet frame apparatus of any preceding clause, wherein a surface of the fluid core is wetted.

The engine inlet frame apparatus of any preceding clause, further including a plurality of heat rejection fins connected to an outer surface of the fluid core.

The engine inlet frame apparatus of any preceding clause, wherein the fluid core is a main flow path, the fluid core further including a bypass pressure valve to bypass the main flow path, the bypass pressure valve in line with a bypass pathway, the bypass pathway in parallel to the main flow path.

The engine inlet frame apparatus of any preceding clause, further including a foreign object debris screen to screen obstructions from entering the air inlet passage.

The engine inlet frame apparatus of any preceding clause, wherein the apparatus is connected in serial flow communication with a return line of a scavenge pump.

The engine inlet frame apparatus of any preceding clause, further including a bypass pathway and a thermostatic bypass valve to bypass flowing the fluid through the fluid core.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A gas turbine engine comprising:
   an inlet frame including an inlet plenum at a first end of an inlet frame flow path, the inlet frame defining an airflow entrance to a compressor, the inlet plenum defined by an inner radius and an outer radius, the outer radius defined by a surface of the inlet frame;
   the compressor at a second end of the inlet frame flow path to provide an airflow through the inlet plenum;
   a plurality of struts supporting the inlet frame flow path, the plurality of struts to form an inner body at the inner radius of the inlet plenum, the outer radius of the inlet plenum to surround the inner body, the inner body defining a radial portion of the inlet frame flow path between the first end and the second end to allow the airflow radially from the inlet plenum to the compressor;
   a pump to circulate a fluid; and
   a fluid core connected to the pump and built at least partially into the inlet frame of the gas turbine engine, the fluid core to route the fluid through the inlet plenum.

2. The gas turbine engine of claim 1, wherein the fluid core has a serpentine pathway through the plurality of struts.

3. The gas turbine engine of claim 1, wherein a surface of the fluid core is wetted.

4. The gas turbine engine of claim 1, further including a plurality of heat rejection fins connected to the fluid core.

5. The gas turbine engine of claim 1, wherein the fluid core is a main flow path, the fluid core further including a pressure bypass valve to bypass the main flow path, the pressure bypass valve in line with a bypass pressure pathway, the bypass pressure pathway in parallel to the main flow path.

6. The gas turbine engine of claim 1, wherein the fluid core is a main flow path, the fluid core further including a thermostatic bypass valve to bypass the main flow path, the thermostatic bypass valve in line with a thermostatic bypass pathway, the thermostatic bypass pathway in parallel to the main flow path.

7. The gas turbine engine of claim 1, further including a foreign object debris screen to screen obstructions from entering the inlet frame flow path.

8. The gas turbine engine of claim 1, wherein a surface of the plurality of struts is wetted.

9. The gas turbine engine of claim 1, further including a plurality of heat rejection fins extending into the inlet plenum.

10. The gas turbine engine of claim 1, wherein the pump is included in a lubrication and scavenge system.

11. The gas turbine engine of claim 10, wherein the fluid core is connected in serial flow communication with a return line of the pump.

12. The gas turbine engine of claim 10, wherein the fluid core is connected in serial flow connection with a fuel-cooled oil cooler.

13. An inlet frame apparatus comprising:
   an air inlet passage positioned upstream of a compressor to allow an airflow through the air inlet passage, the air inlet passage having a plenum at a first end to facilitate air circulation around the air inlet passage, the plenum defined by an inner radius and an outer radius, the outer radius defined by a surface of the inlet frame apparatus;
   a plurality of struts to support the air inlet passage at the inner radius of the inlet plenum, the plurality of struts defining a radial portion of the air inlet passage to allow the airflow radially from the plenum to the compressor; and
   a fluid core at least partially built into the inlet frame apparatus and connected to the plenum, the fluid core to route a fluid through the plenum.

14. The inlet frame apparatus of claim 13, wherein a surface of the fluid core is wetted.

15. The inlet frame apparatus of claim 13, further including a plurality of heat rejection fins connected to an outer surface of the fluid core.

16. The inlet frame apparatus of claim 13, wherein the fluid core is a main flow path, the fluid core further including a bypass pressure valve to bypass the main flow path, the bypass pressure valve in line with a bypass pressure pathway, the bypass pressure pathway in parallel to the main flow path.

17. The inlet frame apparatus of claim 13, further including a foreign object debris screen to screen obstructions from entering the air inlet passage.

18. The inlet frame apparatus of claim 13, wherein the apparatus is connected in serial flow communication with a return line of a pump.

19. The inlet frame apparatus of claim 18, further including a thermostatic bypass pathway and a thermostatic bypass valve to bypass flowing the fluid through the fluid core.

* * * * *

UNITED STATES PATENT AND TRADEMARK OFFICE
CERTIFICATE OF CORRECTION

| | | |
|---|---|---|
| PATENT NO. | : 12,228,075 B2 | Page 1 of 1 |
| APPLICATION NO. | : 18/183758 | |
| DATED | : February 18, 2025 | |
| INVENTOR(S) | : Brown et al. | |

It is certified that error appears in the above-identified patent and that said Letters Patent is hereby corrected as shown below:

In the Claims

In Column 20, Claim 13, Line 39, Delete "inlet".

Signed and Sealed this
Eighth Day of April, 2025

Coke Morgan Stewart
*Acting Director of the United States Patent and Trademark Office*